United States Patent
Kolacny

[11] Patent Number: 6,016,992
[45] Date of Patent: Jan. 25, 2000

[54] STOL AIRCRAFT

[76] Inventor: Gordon Kolacny, 514 W. 29th St., Loveland, Colo. 80538

[21] Appl. No.: 08/844,532

[22] Filed: Apr. 18, 1997

[51] Int. Cl.[7] ............................ B64C 15/00; B64C 27/22; B64C 3/50

[52] U.S. Cl. ............................ 244/12.6; 244/9; 244/12.1; 244/215; 244/219

[58] Field of Search ................................ 244/9, 10, 12.1, 244/12.5, 12.6, 19, 20, 215, 219, 70, 101, 105, 106

[56] References Cited

U.S. PATENT DOCUMENTS

| | | | |
|---|---|---|---|
| 1,487,228 | 3/1924 | Garcia | 244/9 |
| 1,903,818 | 4/1933 | Jutting | 244/12.1 |
| 2,397,189 | 3/1946 | Main | 244/9 |
| 3,065,928 | 11/1962 | Dornier | 244/12.1 X |
| 3,082,976 | 3/1963 | Dornier | 244/12.1 |
| 3,330,500 | 7/1967 | Winborn | 244/12.5 |
| 3,361,386 | 1/1968 | Smith | 244/207 |
| 4,398,683 | 8/1983 | Schmetzer | 244/12.5 |
| 4,478,378 | 10/1984 | Capuani | 244/12.5 |
| 4,705,234 | 11/1987 | Bourn | 244/12.1 |
| 5,098,034 | 3/1992 | Lendriet | 244/12.5 X |
| 5,100,080 | 3/1992 | Servanty | 244/9 |

*Primary Examiner*—Charles T. Jordan
*Assistant Examiner*—Theresa M. Wesson

[57] ABSTRACT

A STOL aircraft has a fuselage 22 vertical 26 and horizontal 27 rear stabilizers and at least one wing made up of a lower primary airfoil 10 and an upper complementary airfoil 11 which, between them, form the inlet 12 and exhaust 14 air ducts. The craft is propelled by one or more cross flow fans 13 contained in a housing(s) 63 (FIG. 7) between the primary 10 and complementary 11 airfoils. The primary 10 and complementary 11 airfoils can be extended and flexed downwardly, by various means.

11 Claims, 7 Drawing Sheets

STOL AIRCRAFT

BACKGROUND OF THE INVENTION

Many airfoil modifications have been considered in the century since the Wright brothers flight at Kitty Hawk. Matthew Orr, U.S. Pat. No. 1,787,321 introduced complementary airfoils. H. P. Massey, U.S. Pat. No. 1,82,919, taught the use of fans and complementary airfoils on wing and horizontal tail surfaces to provide an aircraft which can hover. C. DeGanhal, U.S. Pat. No. 1,881,142, taught the use of slots and engine exhausts to provide boundary layer control on upper wing surfaces.

Variable camber airfoils are taught to be useful by Serge Trey, U.S. Pat. No. 2,478,793; G. D. Bryant et al, U.S. Pat. No. 3,109,613; D. G. Lyon, U.S. Pat. No. 3,179,357; E. M Wright, U.S. Pat. No. 3,332,883; A. W. Smith, U.S. Pat. No. 3,361,386; R. C. Frost et al, U.S. Pat. No. 4,247.066; and S. K. Ferguson, U.S. Pat. No. 4,582,278.

While the concepts taught in much of the referenced prior art were appropriate for their purpose, most of these references failed to make an impact on aviation. The present invention provides an air craft utilizing cross flow fan(s) and better over-the-wing boundary layer control for good STOL applications.

SUMMARY OF THE INVENTION

The short take-off and landing (STOL) vehicle of this invention combines several elements to accomplish the desired result. A primary airfoil(s) with a variable rear configuration combines with a complementary airfoil(s) to form the air intake duct(s), cross flow fan housing(s) and exhaust duct(s) necessary for propulsion and boundary layer control. During the take-off maneuvers, the rear of the primary airfoil(s) is flexed downwardly to enhance the formation of an air cushion. The rear edge of the complementary airfoil can also be extended to aid in boundary layer control. Preferably, the STOL vehicles have pontoon(s) or laterally positioned air dams and secondary airfoils to enhance lift and/or air cushion formation.

DETAILED DESCRIPTION OF THE DRAWINGS

The same numbers are used in several of the figures for analogous elements where possible.

Figure 1:
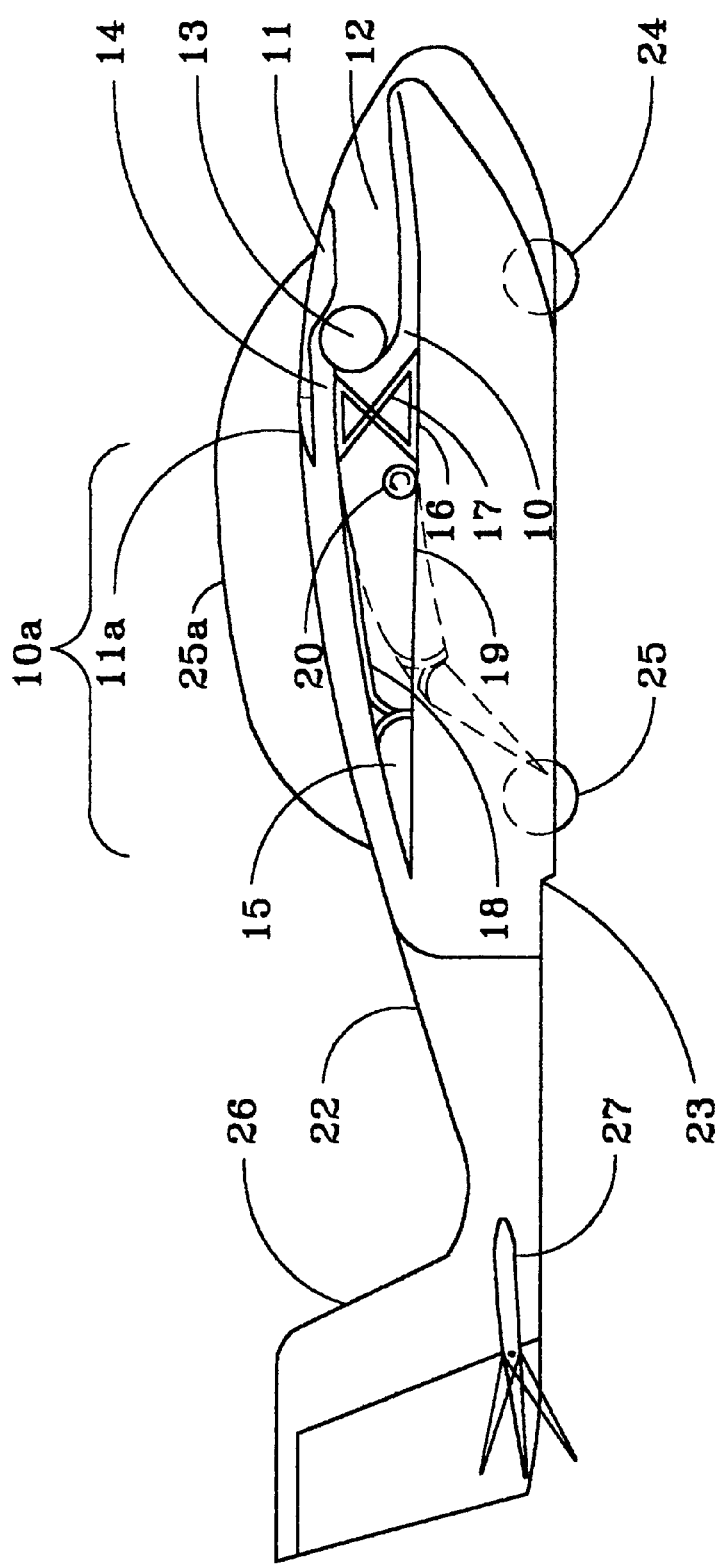
FIG. 1 depicts a single fuselage, amphibian craft with a section of the primary and complementary airfoils and a cross flow fan within the wing.

FIG. 1 is a side view of a light weight amphibian aircraft. The sectioned wing is made up of a primary airfoil 10 and a complementary airfoil 11 which form the air inlet ducts 12. Duct(s) 12 direct the intake air into a cross flow fan 13. The upper surface of primary airfoil 10 and the lower rear surface of complementary airfoil 11 also form the exhaust duct 14.

The rear 10a of primary airfoil 10 is made, in part, of a flexible, light weight material such as sheet metal or sheet polyaramides. It includes flaps 15 to provide necessary air craft control. The rear 11a of complementary airfoil 11 is extensible and can be moved downward to better direct the exhaust air flow over a depressed rear of the primary airfoil flaps 15.

Internal spars and struts 16 and 17 create the necessary rigidity for the central portion of the primary airfoil structure. When the craft "flares" for landing, the rear of the airfoil 10 is deformed. The upper ribs 18 are or can be flexible and bend downwardly when skin 19 is rolled around reel 20. Other ribs, not shown, provide the stability required to ensure a desired rib conformation. The extensible rear 11a and airfoil 11 act as an air braking mechanism when flexed downwardly.

The fuselage 22 has a step 23 to facilitate take-offs from water. Nose wheel 24 and main wheels 25 retract into the fuselage 22 during flight and during water surface operations. The fuselage 22 has the usual cockpit 25a and vertical 26 and horizontal 27 stabilizers in the tail assembly.

Figure 2:
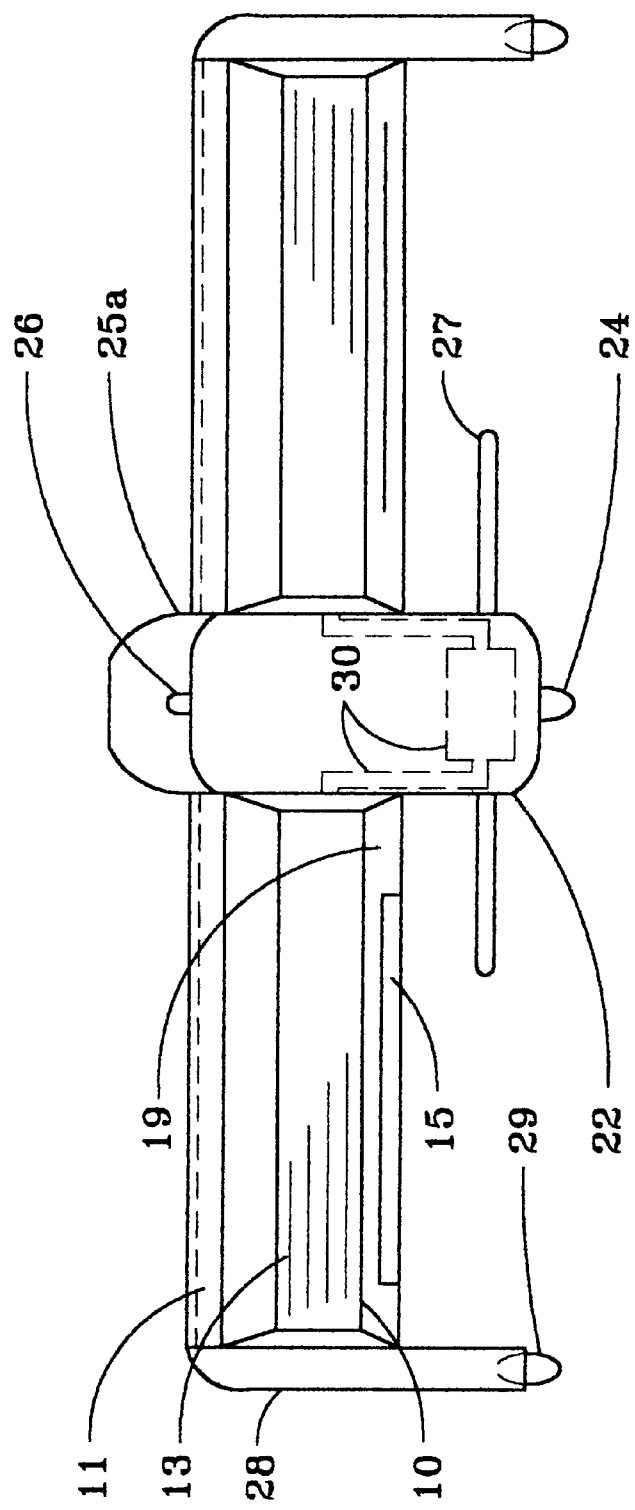
FIG. 2 is a front view of a preferred craft with pontoons.

FIG. 2 shows a craft similar to that of FIG. 1. Pontoons 28 with retractable wheels or skids 29 provide additional lateral stability on land and flotation on water. Power plant and drive train 30 are positioned below the center of lift for greater stability.

Figure 3:
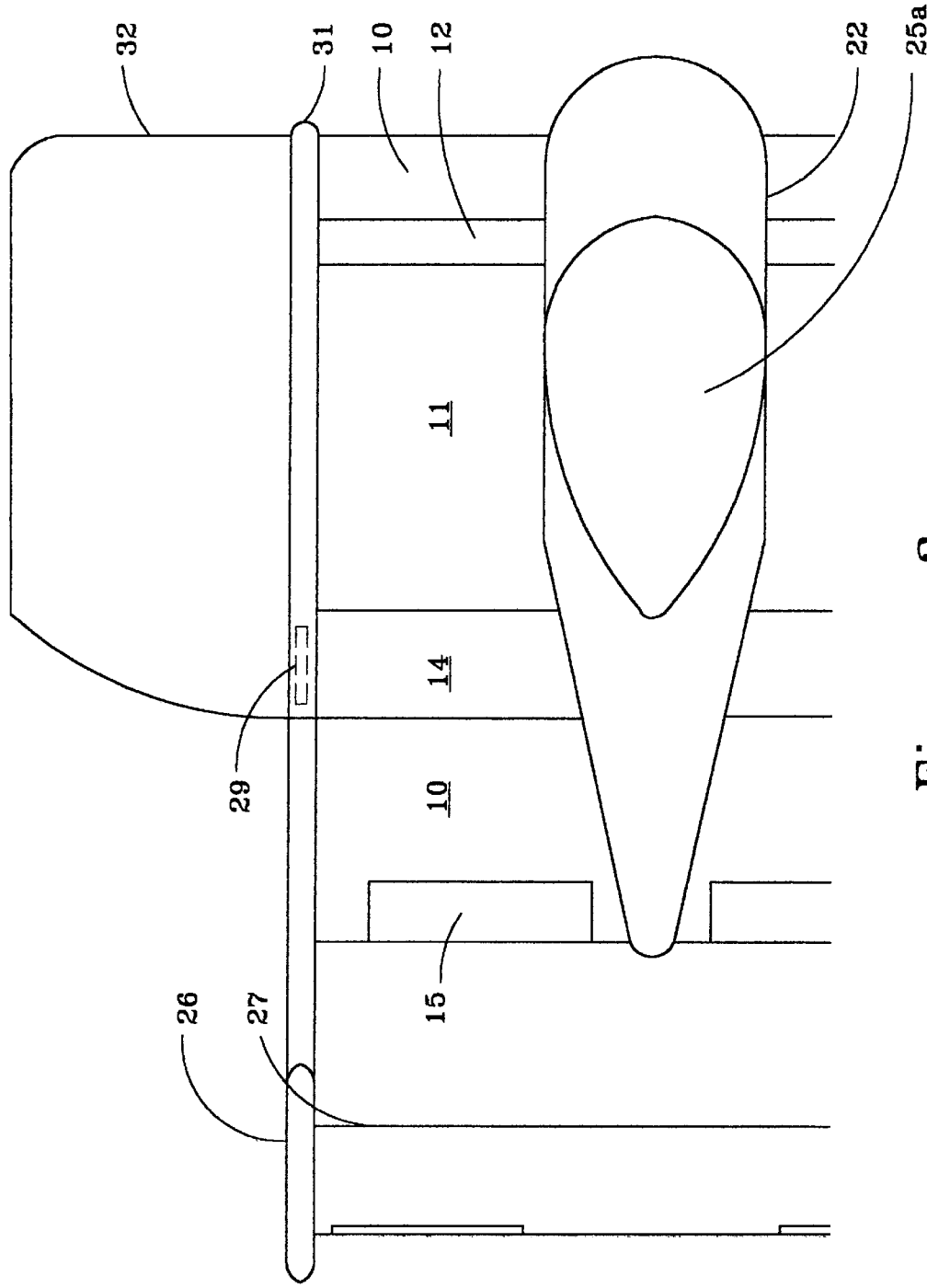
FIG. 3 is a partial top view of a second preferred craft.

FIG. 3 provides a top view of a twin boom 31 craft with secondary airfoils 32 extending beyond booms 31 which form the top of pontoons 28 at the forward end of the booms. Booms 31 can extend above the airfoils, as shown, to form air dams. Servomotor, or hydraulically actuated flaps, 15 can be extended and angled downwardly to facilitate landings while reducing landing speeds.

The craft of this Figure is also designed with hinges and locking mechanisms (not shown) so that the secondary airfoils 32 can be unlocked and rotated upwardly and/or rotated backward and upwardly to reduce the hanger "footprint" area.

Figure 4:
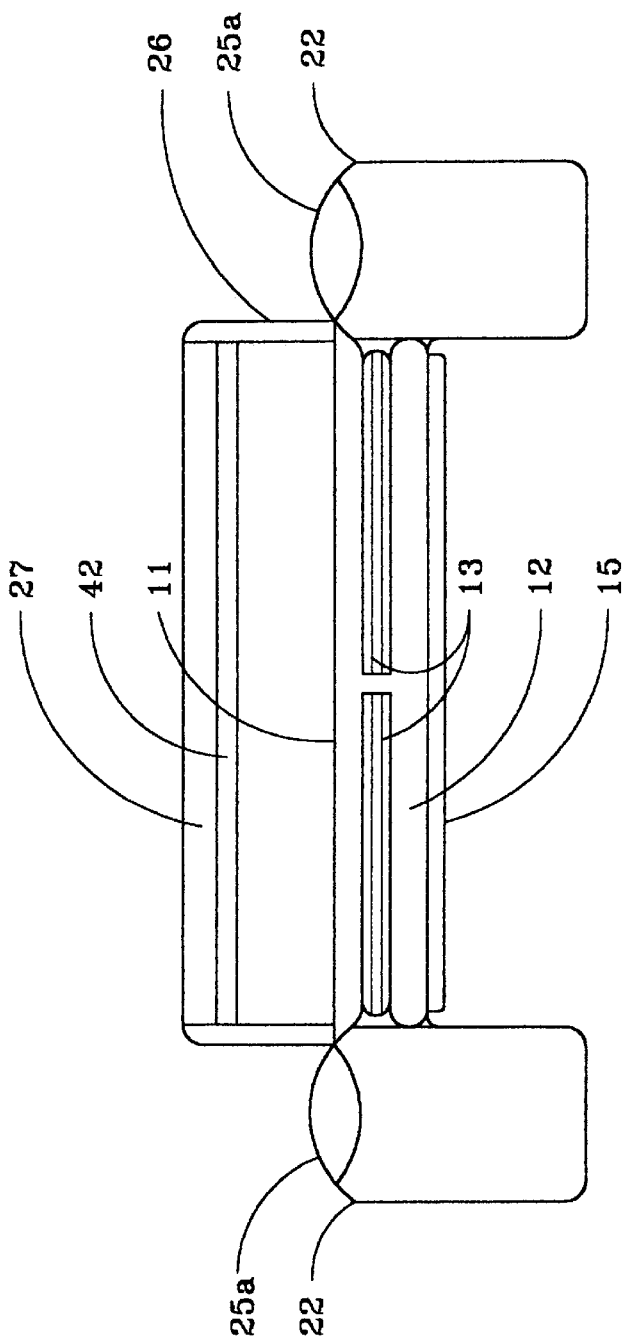
FIG. 4 is a front view of a double hulled craft.

The craft of FIG. 4 has two fuselages 22 and a single flap 15 on the rear of primary airfoil 10. Both utilize servo-mechanisms for human assisted or computer controlled flight to provide desired lift and boundary layer control.

Figure 5:
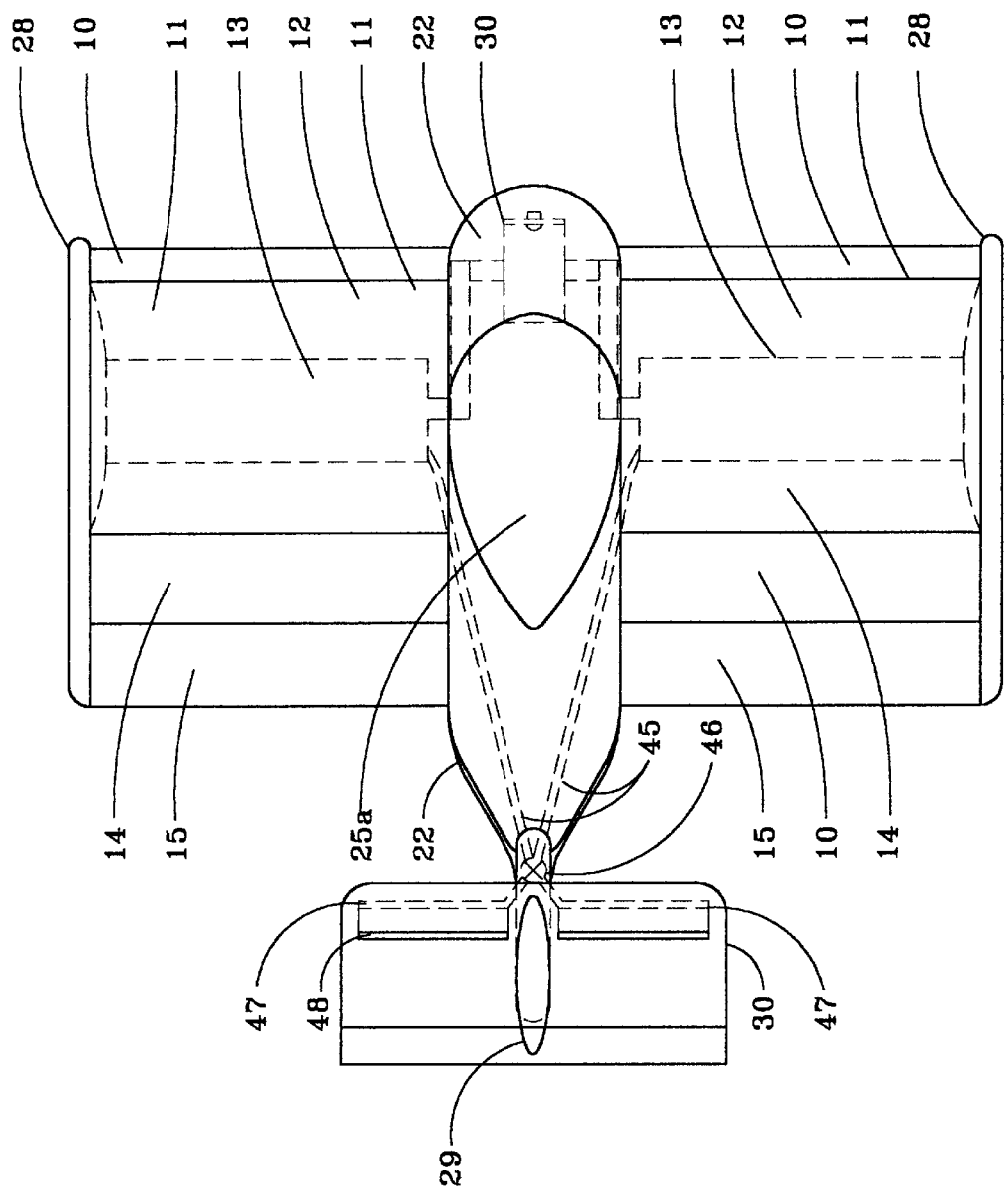
FIG. 5 is a top view of a craft equipped for both wing and rear horizontal stabilizer boundary layer control.

FIG. 5 schematically shows ducts 45 used to convey high pressure air off fans 13 through valving 46, manifolds 47 and through slots 48 for increased boundary layer control over the rear horizontal tail surfaces during landings and take-offs.

Figure 6:
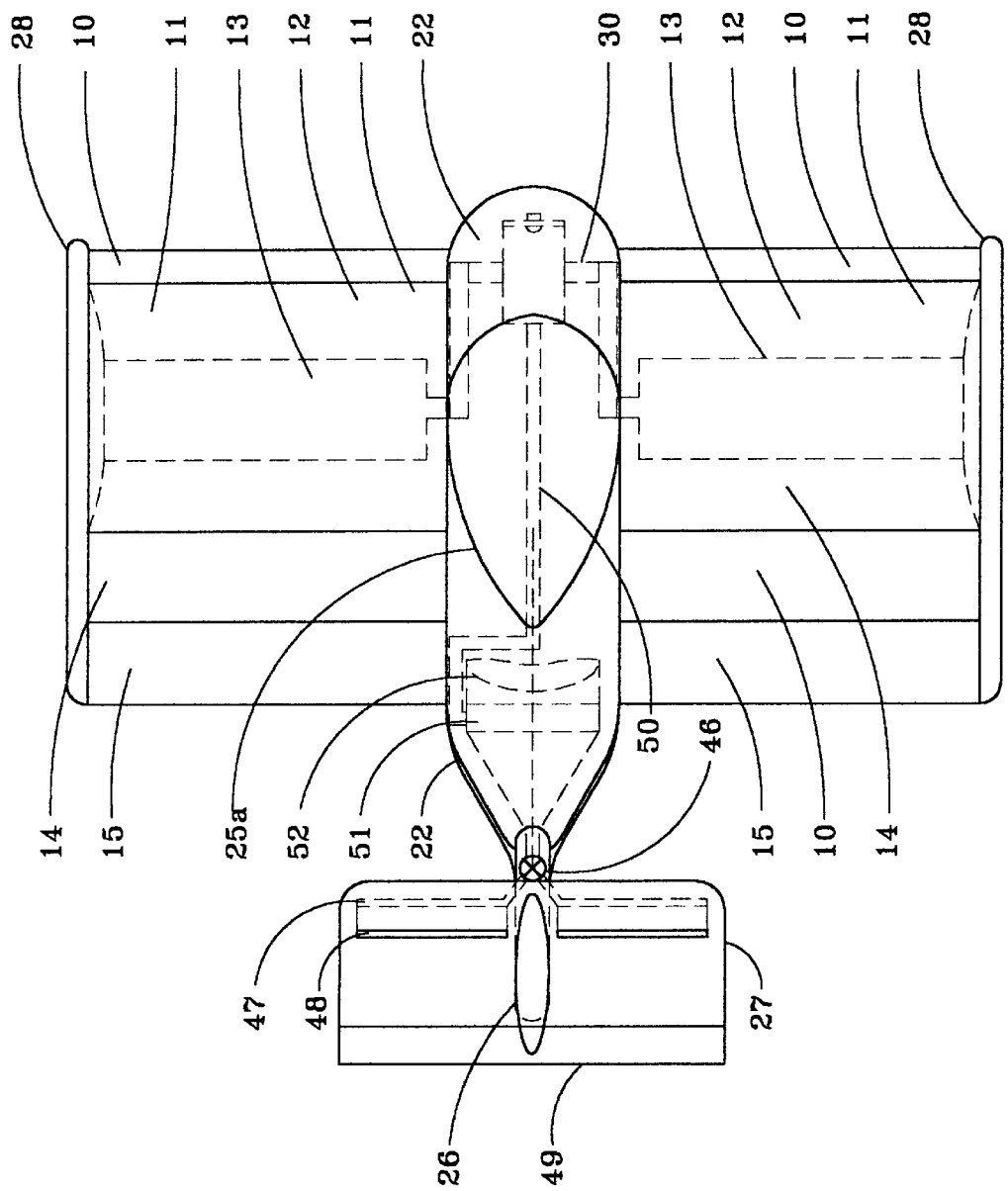
FIG. 6 depicts a craft with a separate rear cross flow fan for enhanced horizontal stabilizer boundary layer control.

FIG. 6 shows an amphibian modification of the craft of FIG. 5. The power from the engine 30 is transferred, via drive train element 50 to a cross flow fan 13 within a cowling 52 to provide added thrust and/or boundary layer control by forcing compressed air from fan 51 through valving 46, manifolds 47 and out through slot 48 and over the upper rear surface of horizontal stabilizer 27 and flaps 49. A separate engine can be substituted for the element 50. Both provide better performance during aerodynamic fight.

Figure 7:
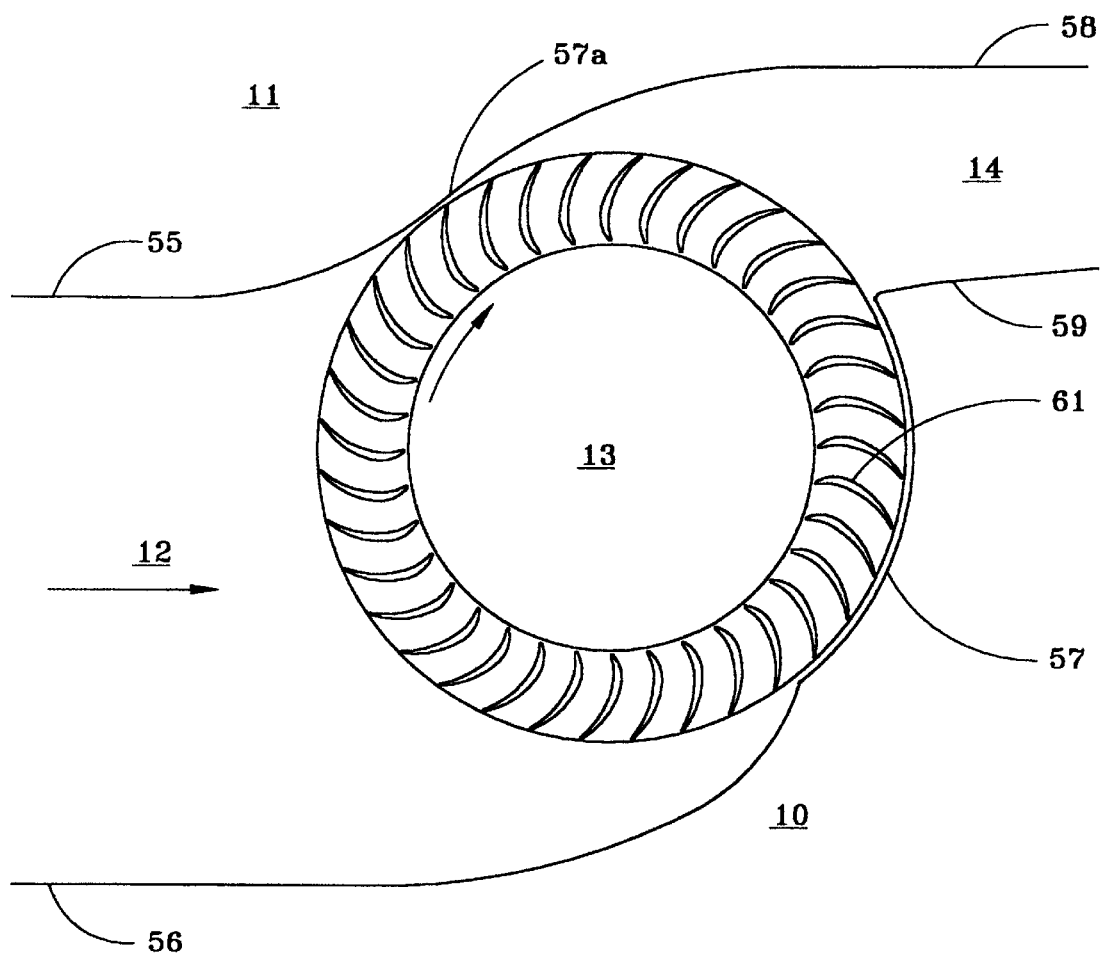
FIG. 7 depicts, schematically, a preferred cross flow fan and ducting configuration.

FIG. 7 schematically shows a section of a preferred configuration for the cross flow and ducting configurations utilized in the craft of the other figures. The lower surface 55 of complementary airfoil 11 acts as the upper surface of the air intake 12. The upper surface 56 of a primary airfoil 10 provides the lower surface. A cross flow fan housing is formed by segment 57 and "point" segment 57a, to provide the compression necessary for successful flight. The surfaces 58 and 59 form the exhaust duct 14. Inlet duct 12 encloses about 180 degrees of the fan surface while the exhaust duct 14 encloses approximately 100–105 degrees.

The number of blades in the fan can vary from about 24 to about 44. The efficiency of the fan increases with increasing numbers of blades. This fan design is preferred because of its low cost, adaptability and its operational efficiency at a wide range of revolutions per minute.

The ram air traveling through the inlet duct is further compressed within the rotating fan. Energy is added by the centrifugal forces exerted by the fan blades. The fan diameter, length and blade configuration will depend on the aircraft in which it is to be used. The usage can be in under-the-wing exhaust designs, e.g., for hovercraft, as well as the over-the-wing craft of this application.

Figure 8:
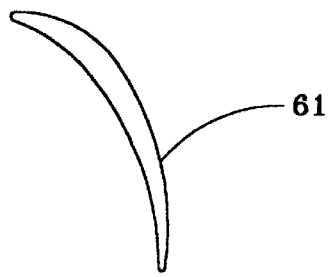
FIG. 8 depicts a preferred cross flow fan blade configuration.

FIG. 8 is a preferred configuration for the blades 61 of a cross flow fan 13. They provide, when attached within a cross flow fan 13, air velocities which range up to 2.5–3 times blade tip speeds. Preferably, the blade angles within the cross flow fan are controllable for noise control as well as performance control.

Blades 61 similar to those of FIG. 8 are assembled into the fan of FIG. 7 with, preferably, an 80 degree forward curve. The rotating blade angles change with respect to the air stream flowing through the inlet air ducts. As the angle changes, the inlet air is compressed and subjected to a centrifugal force thereby causing compressed air to be discharged through the exhaust duct at air speeds which preferably range from about 2 to about 3 times the blade tip speeds.

The ratio between the chord of a blade 61 and radius of the fan 13 is approximately 1:5 with the blade biting into the air stream at angles of about 60 degrees and a blade arc of about 70 degrees. The air flow across the center of the fan is minimized. This approach reduces the formation of vortices and other nonplanar air flow problems.

Preferably, the blade angles are controllable to provide improved noise control at low altitudes.

I claim:

1. In an aircraft having at least one fuselage, at least one engine, at least one wing and at least one rear stabilizer, the improvement comprising:
   at least one primary airfoil with the upper side of each such one airfoil forming the lower surface of an air intake duct, exhaust duct and a portion of a cross flow fan housing, and a rear portion of the primary airfoil which can be flexed downwardly, and
   at least one complementary airfoil extending over a portion of the primary airfoil with the lower side of each such complementary air foil forming the upper surface of the air inlet duct, the exhaust duct and a portion of the cross flow fan housing, and
   a cross flow fan positioned within each of the at least one cross flow fan housing.
2. The craft of claim 1 having multiple fuselages.
3. The craft of claim 1 further including pontoons.
4. The craft of claim 1 further including air brake means.
5. The craft of claim 1 further including secondary airfoil means for providing additional lift.
6. The craft of claim 1 further including an air dam on each wing.
7. The craft of claim 1 wherein the rear of each of the at least one primary airfoils includes reel means for modifying the rear portion at the rear of the at least one primary airfoils.
8. The craft of claim 1 wherein each of the at least one primary airfoils includes a rear extensible portion and rotationally operable flaps.
9. The craft of claim 1 further including means for conducting compressed air from at least one of the cross flow fans to the at least one rear horizontal stabilizer and to slots in each upper surface of the at least one rear horizontal stabilizer.
10. The craft of claim 1 further including within the forward portion of the rear horizontal stabilizers an additional intake air duct, cross flow fan housing, exhaust duct and cross flow fan positioned within the fan housing for exhausting compressed air over the upper surface of the rear horizontal stabilizers.
11. The craft of claim 1 wherein each of the at least one fuselage is stepped.

* * * * *